United States Patent [19]
Kyoichi

[11] Patent Number: 5,195,698
[45] Date of Patent: Mar. 23, 1993

[54] DRAG MECHANISM IN SPINNING REEL FOR FISHING

[75] Inventor: Kaneko Kyoichi, Tokyo, Japan

[73] Assignee: Daiwa Seiko, Inc., Tokyo, Japan

[21] Appl. No.: 611,716

[22] Filed: Nov. 13, 1990

[30] Foreign Application Priority Data

Nov. 17, 1989 [JP] Japan ............................ 1-133071[U]
Nov. 17, 1989 [JP] Japan ............................ 1-133072[U]
Jun. 15, 1990 [JP] Japan ............................ 2-62718[U]

[51] Int. Cl.⁵ .......................................... A01K 89/027
[52] U.S. Cl. ...................................... 242/245; 242/246
[58] Field of Search ........................ 242/244, 245, 246

[56] References Cited

U.S. PATENT DOCUMENTS

| | | | |
|---|---|---|---|
| 4,572,448 | 2/1986 | Ban | 242/245 |
| 4,634,073 | 1/1987 | Coqnelet | 242/245 |
| 4,650,161 | 3/1987 | Kaneko | 242/246 X |
| 4,702,430 | 10/1987 | Saito | 242/245 |
| 4,746,077 | 5/1988 | Toda | 242/245 |
| 4,776,526 | 10/1988 | Saito | 242/245 |
| 4,830,307 | 5/1989 | Lassi et al. | 242/245 |
| 4,834,307 | 5/1989 | Larsson et al. | 242/245 |

FOREIGN PATENT DOCUMENTS

392501 10/1990 European Pat. Off. .
4012775 10/1990 Fed. Rep. of Germany .

*Primary Examiner*—Daniel P. Stodola
*Assistant Examiner*—Michael R. Mansen
*Attorney, Agent, or Firm*—Longacre & White

[57] ABSTRACT

A drag mechanism in a spinning reel for fishing, comprising; a reel casing; an actuator member having a lower end portion pivoted on a lower portion of the reel casing and having an upper end portion pulled backward by a spring; a yoke pivoted across the actuator member; a spool shaft; a braking cylinder having a drag mechanism means and engagement holes; a cylindrical shaft fitted in a rear end of the spool shaft so as to be slidable only in the axial direction and rotatably locked in the yoke, the cylindrical shaft having engagement portions axially engageably/disengageably fitted in the engagement holes; and an operation lever pivoted on a rear portion of the reel casing. The operation lever has an actuating portion engaged with the rear side of and upper portion of the actuator member, and is provided with a spring for distribution-urging the lever in the directions opposite to each other.

13 Claims, 9 Drawing Sheets

DRAG MECHANISM IN SPINNING REEL FOR FISHING

BACKGROUND OF THE INVENTION

The present invention relates to an improvement of a spinning reel for fishing having a drag mechanism for applying a braking force to a spool.

To facilitate fishing, it is known that a drag mechanism in the spinning reel can be immediately changed from a state in which drag is actuated to a second state in which the spool of the reel is freely rotatable. Japanese Unexamined Publication No. sho-61-274638 disclosed such a mechanism.

In the former system, however, there have been problems in that since a cylindrical shaft engageable/disengageable with/from a braking cylinder having a drag mechanism is slid directly by an operation lever so as to engage/disengage with/from the braking cylinder, in the case where the drag mechanism is to be changed over to return into a drag-actuated state from a spool-free state by rotational operation of a handle, if the engagement position of engagement holes of the cylindrical shaft does not accord with that of engagement positions of the braking cylinder, an excessive force is exerted onto the operation lever and the engagement portions so that the returning change-over operation cannot be smoothly and lightly performed. Since the cylindrical shaft is directly pressed by a front end portion of the operation lever so as to slide, the efficiency of transmission is poor and therefore the sliding operation of the operation lever cannot be smoothly performed.

In the latter system, on the other hand, there has been a problem in that since change-over is performed by making an operation lever cause a lock member to be radially engaged/disengaged with/from a part of ratchet teeth provided on the outer circumference of a braking cylinder having a drag mechanism, the strength and durability of engagement portions of the lock member decrease and a change-over mechanism becomes large in size in the radial direction.

SUMMARY OF THE INVENTION

In view of such current circumstances, an object of the present invention is to provide a system for changing-over a drag mechanism in a spinning reel for fishing in which engagement operation between a cylindrical shaft and a braking cylinder or a casing is smoothly and surely performed at the time of change-over to return into a drag-actuated state from a spool-free state so that the change-over mechanism is not excessively large in size while intending an improvement in strength of the engagement portions.

In order to attain the above object, according to the present invention, in the case of a rear drag system, the drag mechanism constitutes a reel casing; an actuator member having a lower end portion pivoted on a lower portion of the reel casing and having an upper end portion pulled backward by a spring; a yoke pivoted across the actuator member; a spool shaft; a braking cylinder having a drag mechanism means and engagement holes; a cylindrical shaft fitted in a rear end of the spool shaft so as to be slidable only in the axial direction and rotatably locked in the yoke, the cylindrical shaft having engagement portions axially engageably/disengageably fitted in the engagement holes; and an operation lever pivoted on a rear portion of the reel casing, the operation lever having an actuating portion engaged with the rear side of an upper portion of the actuator member, the operation lever being provided with a spring for distribution-urging the lever in the directions opposite to each other. In the case of a front drag system, the drag mechanism in a spinning reel for fishing constitutes a reel casing having engagement holes formed at its rear end portion; an actuator member having a lower end portion pivoted on a lower portion of the reel casing and having an upper end portion pulled backward by a spring; a yoke pivoted across the actuator member; a spool shaft having a drag mechanism means provided at its top end portion; a cylindrical shaft fitted in a rear end of the spool shaft so as to be slidable only in the axial direction and rotatably locked in the yoke, the cylindrical shaft having engagement portions axially engageably/disengageably fitted in the engagement holes; and an operation lever pivoted on a rear portion of the reel casing. The operation lever has an actuating portion engaged with the rear side of an upper portion of the actuator member. The operation lever is also provided with a spring for distribution-urging the lever in the directions opposite to each other.

Further, in the case where returning change-over from a spool-free state into a drag-actuated state is performed by a rotation operation of a handle, a return member provided with kick portions and urged by a spring so as to be rotatable by a predetermined angle is fittingly mounted on a handle shaft at the rear surface of a drive gear. In addition, a return portion is projectingly provided on the operation lever, and a return actuator member urged by a spring and engaged with the return portion so as to be made to come inside/outside the rotational lOcus of the return member by the actuation of the operation lever is pivoted on the reel casing at a portion between the return member and the return portion. This arrangement insures that the operation lever is returned to the position in the drag-actuated state by the rotation of the return member due to the rotation of the drive gear through the return actuator member.

Further, a braking body partially provided with click teeth is integrally fitted on an outer circumferential portion of the cylindrical shaft, a click pawl is engaged with the click teeth, and a braking member is made into contact with an outer circumference of the braking body with a variable contacting force. It is possible, therefore, to generate a click sound at the time of drag braking and it is possible to finely adjust the spool free force and the drag braking force by adjusting the degree of contact of the braking member.

According to the present invention, when the operation lever is swung backward by manual operation, the actuating portion of the operation lever makes the actuator member slant against the spring to thereby make the cylindrical shaft slide forward through the yoke so as to make the engagement portions of the cylindrical shaft disengage from the engagement holes in the braking cylinder or in the casing so that the cylindrical shaft rotating together with the spool shaft becomes freely rotatable to thereby realize a spool free-rotating state.

Next, when the operation lever is directly returned forward from this state or the drive gear is rotated by the rotation of the handle to thereby make the operation lever return forward through the return member, the return actuator member engages the return member, and the return portion of the operation lever, the actuator member is returned by the spring to the upright state. Further the yoke of the actuator member makes the cylindrical shaft slide backward, so that the engagement portions of the cylindrical shaft engage with the engagement holes in the braking cylinder or in the casing to thereby make the spool shaft return to a drag-actuated state.

Since the click pawl engages with the click teeth of the braking body in the drag-actuated state, a click sound is generated in the reverse rotation of the spool shaft. Further, by adjusting the degree of pressing of the braking member against the braking body, it is possible to finely adjust the spool free force and the drag braking force.

DETAILED DESCRIPTION OF THE PREFERRED EMBODIMENT

An embodiment of the present invention will be described with reference to FIGS. 1 through 6 of the accompanying drawings. A rear end portion of a spool shaft 3 provided at its front end with a spool 1 and arranged so as to be reciprocally slid by a known slide mechanism 2 is formed to be an imperfect-circular shaft portion 3'. A cylindrical shaft 9 having an annular groove 4, spline-shaped engagement portions 7, and a support portion 8 formed in this order from its front end portion is fitted on the imperfect-circular shaft portion 3' so as to be slidable only in the axial direction. Further, a braking body 6 having click teeth 5 engages with the outer circumference of the cylindrical shaft 9 so as to be slidable only in the axial direction.

Figure 1:
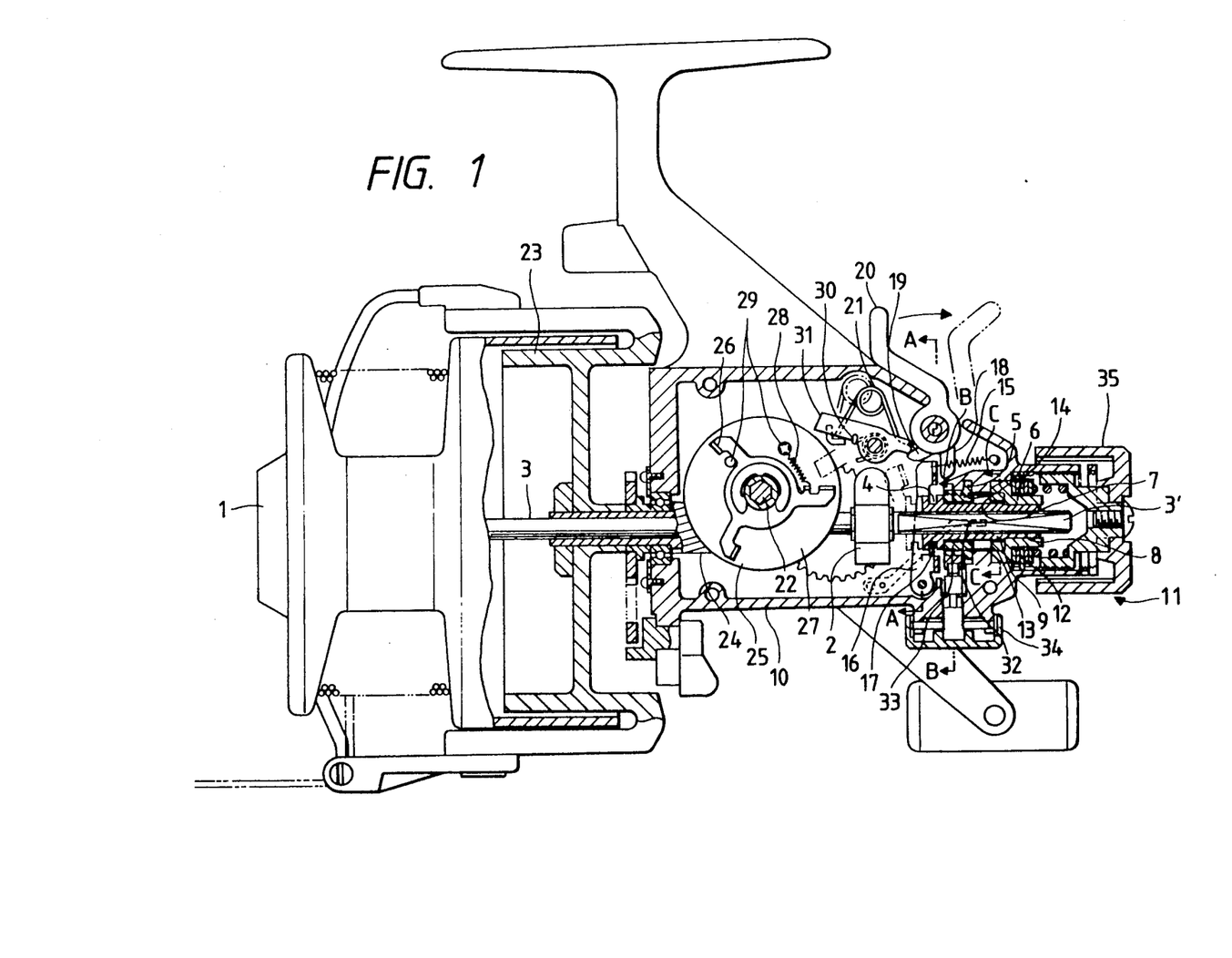
FIG. 1 is a partially broken front view of the first embodiment of the present invention.

Moreover, a braking cylinder 14 having a braking plate 12 of a drag mechanism 11 fittingly mounted at its rear portion and having engagement holes 13 formed in its front portion so as to engage with the engagement portions 7 is supported on a rear portion of a reel casing 10, so that the engagement holes 13 and the engagement portions 7 are made to engage/disengage with/from each other by making the support portion 8 of the cylindrical shaft 9 slide in the front/rear direction in the braking cylinder 14.

A gate-shaped actuator member 16 having an upper portion pulled backward by a spring 15 is pivoted on a portion of the reel casing 10 substantially below the annular groove 4 of the cylindrical shaft 9. A yoke 17 is provided across a substantially middle portion of the actuator member 16 so as to rotatably engage with the annular groove 4.

An operation lever 20 having an actuating portion 18 which engages with the upper rear side of the actuator member 16 and having a return portion 19 disposed in front of the actuating portion 18 is pivoted on an upper portion of the reel casing 10, and distribution-urged by a spring 21 in the front and rear directions opposite to each other.

Further, a drive gear 25 which meshes with a pinion 24 for rotating a rotator 23 is mounted on a handle shaft 22 provided on the reel casing 10 in a known manner, and a return member 27 having one or plural kick portions 26 is fittingly mounted on a portion of the handle shaft 22 at the rear surface of the drive gear 25. Further, a spring 28 urging the return member 27 and projections 29 for regulating the rotation of the return member 27 are provided on the rear surface of the drive gear 25.

A return actuator member 31 urged by a spring 30 and engaging with the return portion 19 is pivoted on a portion of the reel casing 10 between the return member 27 and the return portion 19 of the operation lever 20, so that the front end of the return aCtuatOr member 31 is kept outside the rotational locus of the kick portions 26 of the return member 27 when the operation lever 20 is in its upright position while it is kept inside the rotational locus of the kick portions 26 of the return member 27 when the operation lever 20 is in its rearward-swung position.

Further, a click pawl 32 of a flat spring engages with the click teeth 5 of the braking body 6 provided on the cylindrical shaft 9, and a braking member 33 is provided on a lower portion of the outer peripheral surface of the braking body 6 so that braking member 33 can be pressed against the braking body 6 by a knob 34 attached on the spool casing 10. Moreover, a drag adjustment knob 35 is attached on the drag mechanism 11 in a known manner.

When the operation lever 20 is in its upright state as shown in FIG. 1, therefore, the actuator member 16 is pulled by the spring 15 so that the yoke 17 holds the cylindrical shaft 9 so that the engagement portions 7 of the cylindrical shaft 9 engages with the engagement holes 13 of the braking cylinder 14. This makes the braking cylinder 14 having the drag mechanism 11 rotate together with the spool shaft 3 through the cylindrical shaft 9 to thereby perform drag braking on the spool shaft 3 by means of the drag mechanism 11, while the front end of the return actuator member 31 is held outside the rotational locus of the kick portions 26 of the return member 27 provided on the handle shaft 22 at the rear surface of the drive gear 25.

Figure 2:
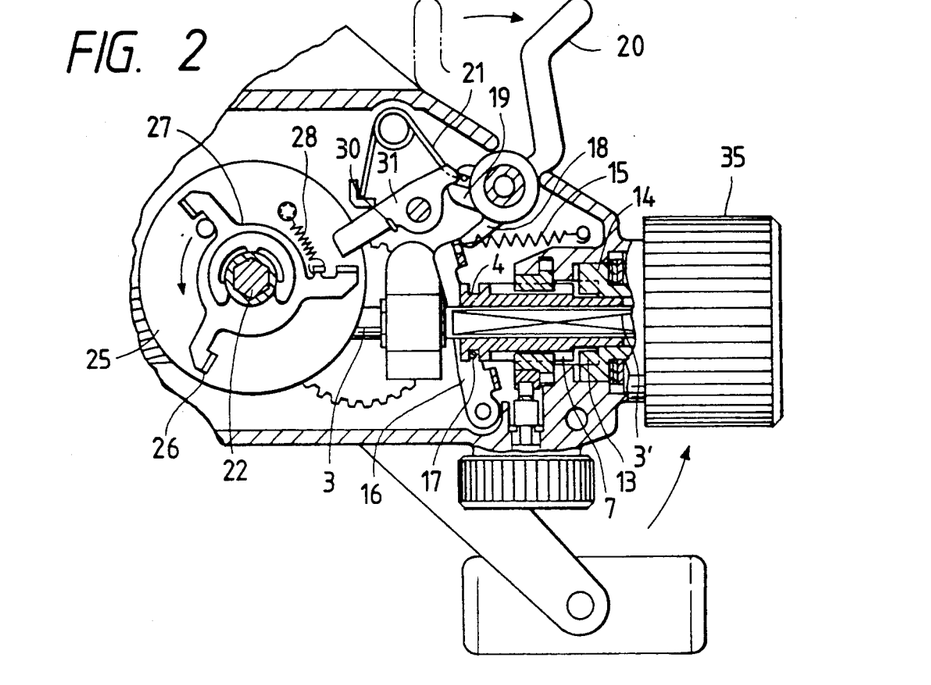
FIGS. 2 and 3 are views for explaining the actuated state of the present invention.

Next, in order to change-over this drag-actuated state into a spool-free state, the operation lever 20 is swung backward as shown in FIG. 2 to thereby make the actuator member 16 slant forward against the spring 15. As a result, the yoke 17 slides on the cylindrical shaft 9 forward so that the engagement portions 7 is disengaged from the engagement holes 13 of the braking cylinder 14, and the spool shaft 3 is separated from the drag mechanism 11 so as to be rotatable, resulting in a spool-free state. At the same time, the return actuator member 31 is rotated by the return portion 19 so as to hold the front end of the return actuator member 31 inside the rotational locus of the kick portions 26 of the return member 27.

If the spool shaft 3 rotates inversely in the spool-free state, the click teeth 5 of the braking body 6 rotating together with the cylindrical shaft 9 generate a sound because of its engagement with the click pawl 32 to thereby inform of the reverse rotation.

Figure 3:
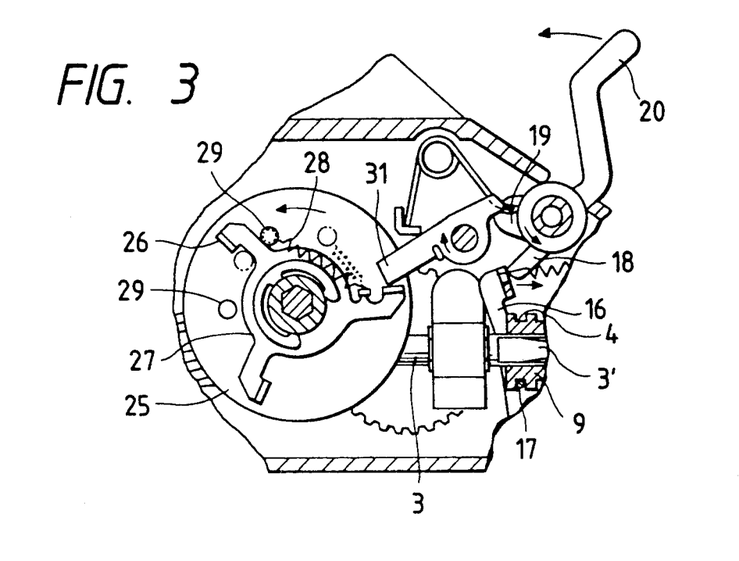
Figure 4:
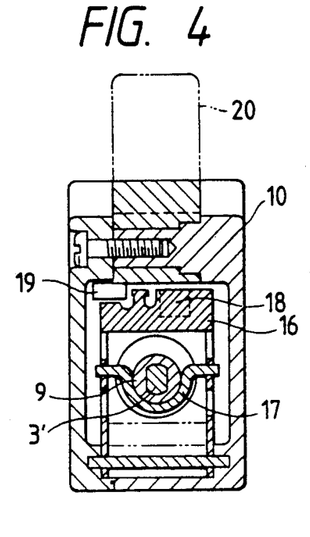
FIG. 4 is a section taken on line A—A of FIG. 1.
Figure 5:
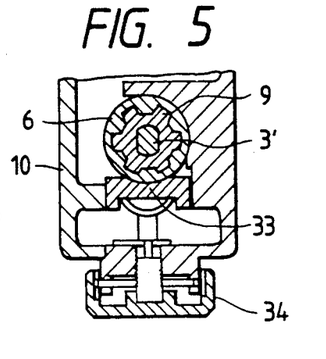
FIG. 5 is a section taken on line B—B of FIG. 1.
Figure 6:
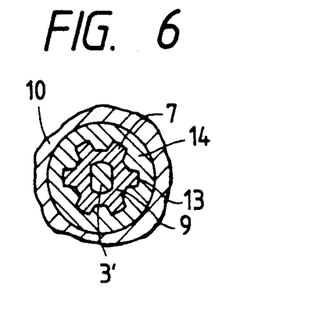
FIG. 6 is a section taken on line C—C of FIG. 1.

Further, in order to perform returning change-over from this spool-free state into the drag actuated state again, the handle shaft 22 is rotated as shown by an arrow of FIG. 3. As a result, the kick portions 26 of the return member 27 rotate with the rotation of the handle shaft 22 to thereby engage with the front end of the return actuator member 31 so that the return actuator member 31 is rotated so as to pass over the dead point of the spring 21. Therefore, the operation lever 20 returns to the upright position in the drag-actuated state to thereby make the cylindrical shaft 9 slide backward so as to make the engagement portions 7 engage with the engagement holes 13 to thereby return- hold the front end of the return actuator member 31 outside the rotational locus of the kick portions 26.

If the spool shaft 3 rotates inversely in the drag-actuated state, the click teeth 5 are made to generate a sound by the click pawl 32 to thereby inform of the reverse rotation. Further, the force for urging the braking member 33 against the braking body 6 is adjusted by the knob 34 so that the drag braking force and the spool free force can be finely adjusted.

Figure 7:
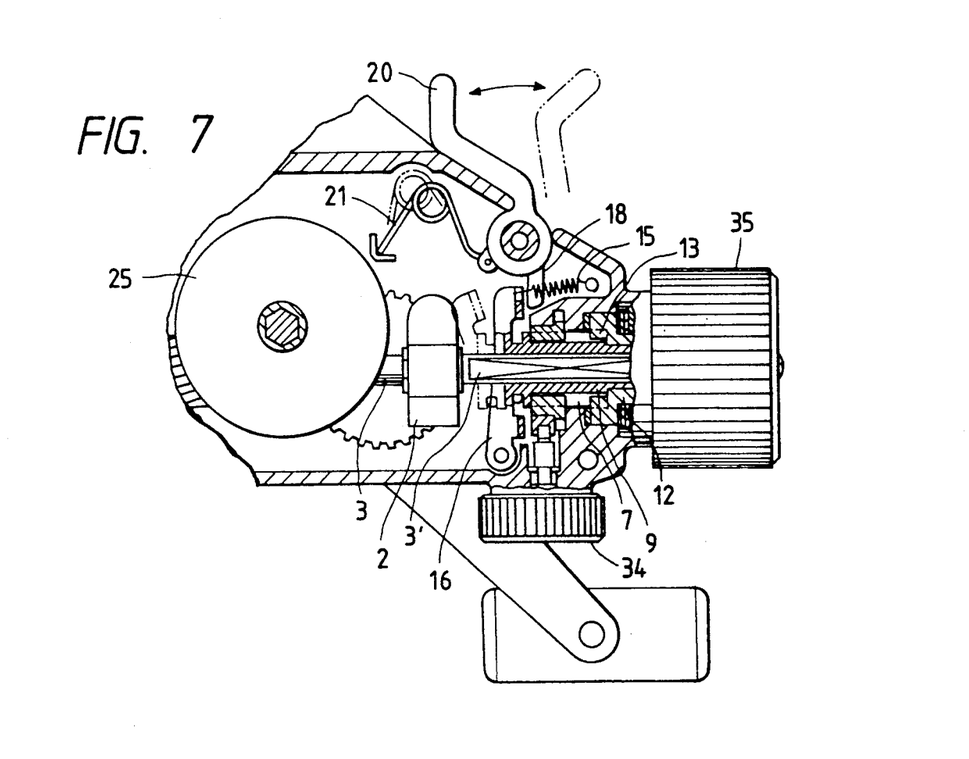
FIGS. 7 and 8 are partially broken front views showing main part of the second and the third embodiments of the present invention.
Figure 8:
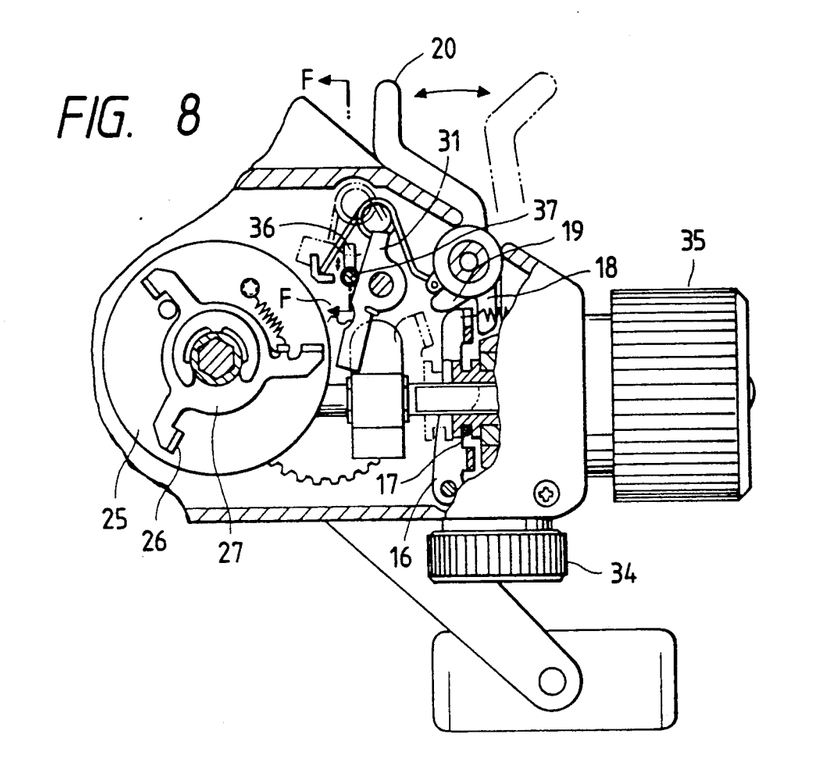
Figure 9:
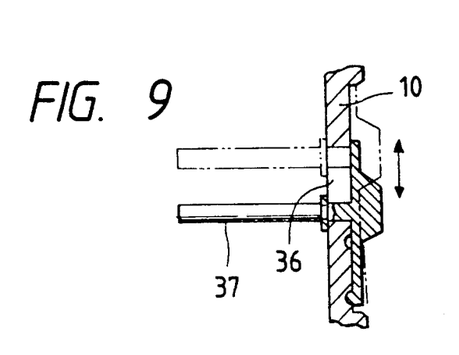
FIG. 9 is a section taken on line of F—F of FIG. 8.

FIG. 7 shows an embodiment having a configuration in which both change-over from a drag-actuated state into a spool-free state and returning change-over from the spool-free state into the drag-actuated state are performed by the operation of an operation lever. FIGS. 8 and 9 show an embodiment having a configuration in which an automatic returning change-over mechanism by means of the rotation of a handle shaft is made to operate or not to operate in the embodiment of FIGS. 1 through 6. Specifically, a regulator rod 37 for regulating a return actuator member 31 is vertically slidably provided in an elongated hole 36 of a reel casing 10 so that the return actuator member 31 does not interlock with a return portion 19 and a return member 27. When the regulator rod 37 is slid to a lower position as shown in FIG. 8, the return actuator member 31 is held in its non-actuated position so that the operation can be performed only by an operation lever in the same manner as the embodiment of FIG. 7. When the regulator rod 37 is slid, as to be held in its upper slide position, on the contrary, returning change-over from a spool-free state into a drag-actuated state is automatically performed by the rotation of the handle shaft in the same manner as the embodiment of FIGS. 1 through 6.

Figure 10:
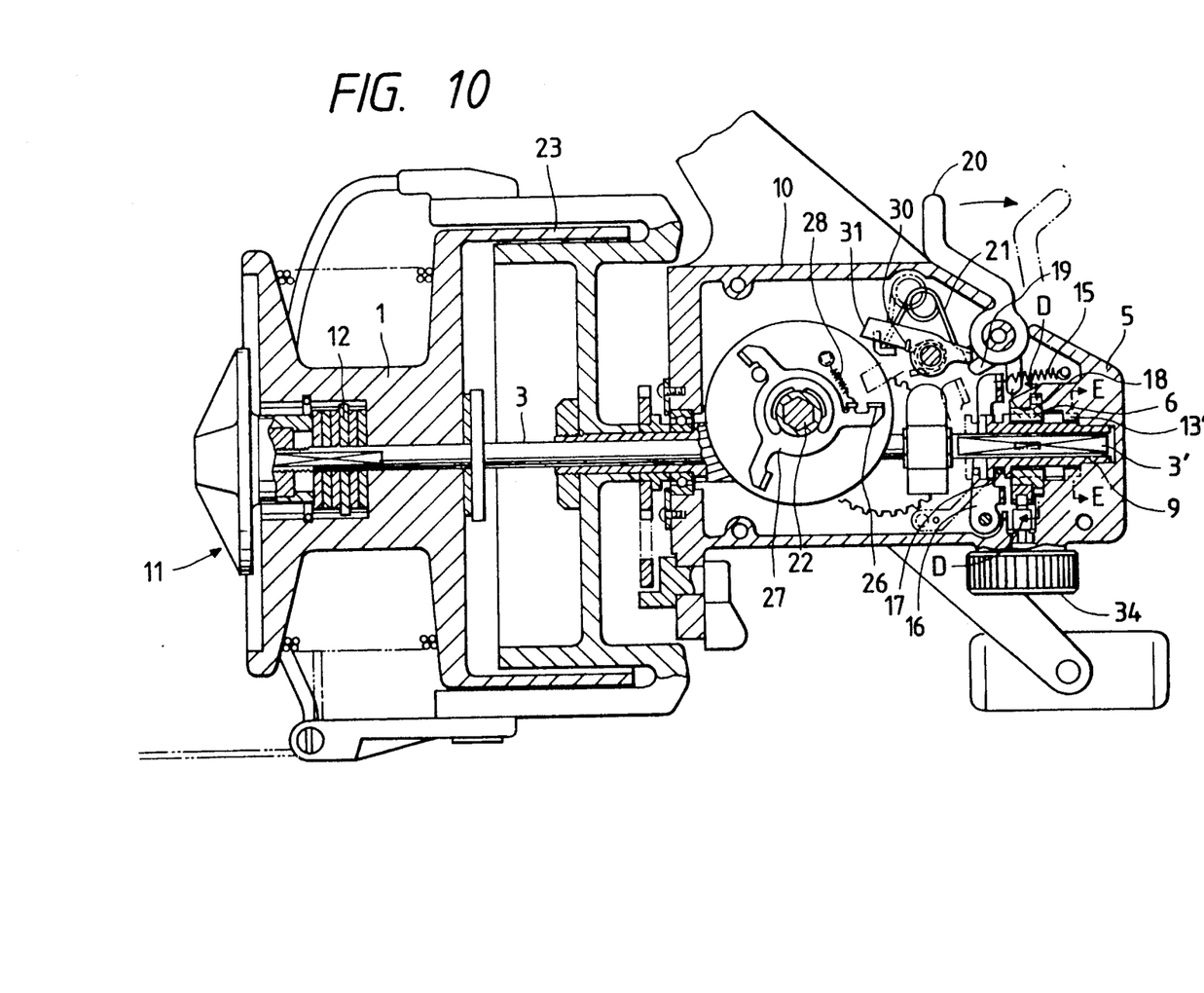
FIG. 10 is a partially broken front view showing the fourth embodiment of the present invention.
Figure 11:
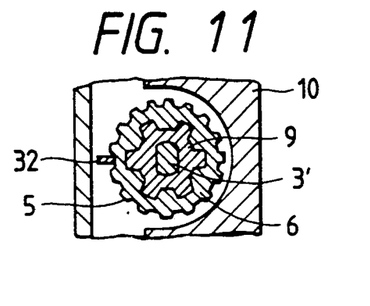
FIG. 11 is a section taken on line of D—D of FIG. 10.
Figure 12:
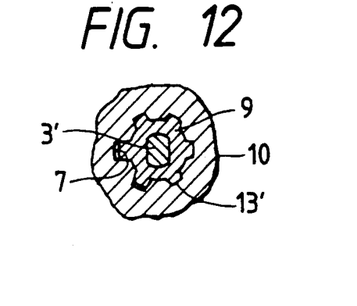
FIG. 12 is a section taken on line of E—E of FIG. 10.

Moreover, FIG. 10 shows an embodiment of the front drag system in which a drag mechanism 11 is provided between the front end of a spool shaft 3 and a spool 1. Spline-shaped engagement portions 7 of a cylindrical shaft 9 are formed so as to be engageable/disengageable with/from engagement holes 13' formed in a reel casing 10.

Figure 13:
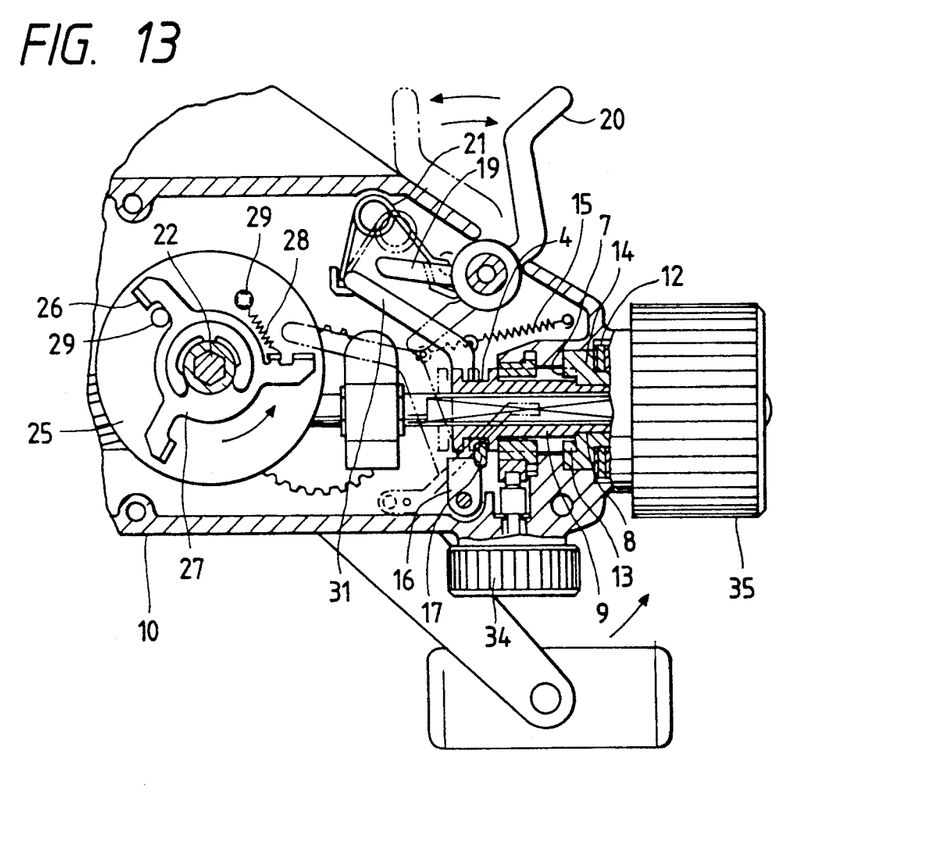
FIG. 13 is a partially broken front view showing the main part of the fifth embodiment of the present invention.

FIG. 13 shows an embodiment in which the return actuator member 31 is integrally formed with the upper end of the actuator member 16. When the operation lever 20 is swung forward, the return portion 19 engages with the return actuator member 31 to make the actuator member 16 slant forward to thereby make the cylindrical shaft 9 slide forward so as to make the engagement portions 7 disengage form the engagement holes 13 to bring the spool shaft into its free-rotating state. Further, the front end of the return actuator member 31 is made to come inside the rotational locus of the return member 27. Next, when the drive gear 25 is rotated by the rotation of the handle shaft 22 in the above state, the kick portions 26 make the actuator member 16 upright through the return actuator member 31 so as to return to the spool-drag state.

In this embodiment, since the spring 15 for pulling the actuator member 16 can be used also for urging the return actuator member 31 outside the rotational locus of the return member 27, the spring for the return actuator member 31 can be omitted, and further, the actuating portion 18 of the operation lever 20 can be omitted.

Figure 14:
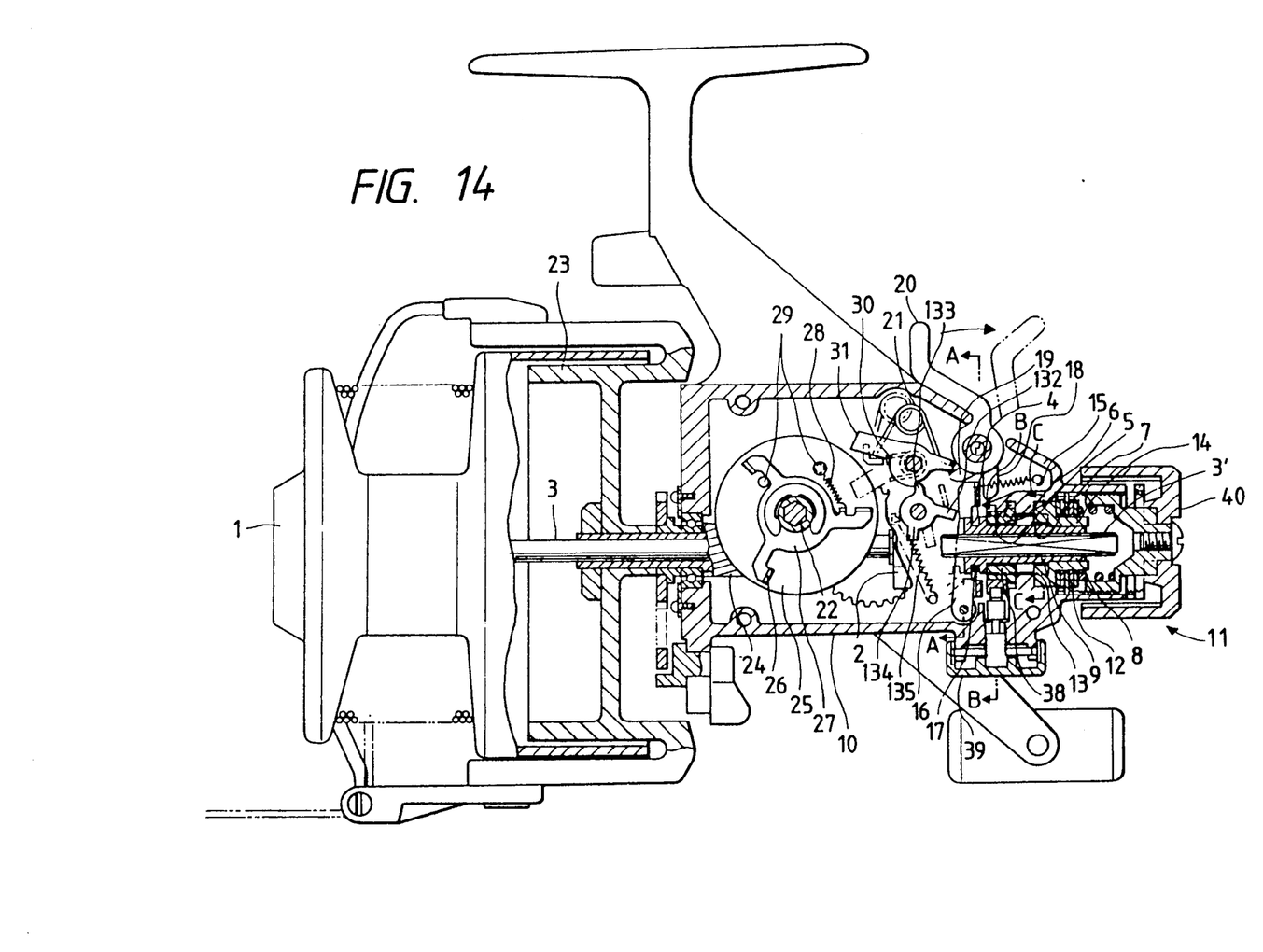
FIG. 14 is a partially broken front view of the sixth embodiment of the present invention.
Figure 15:
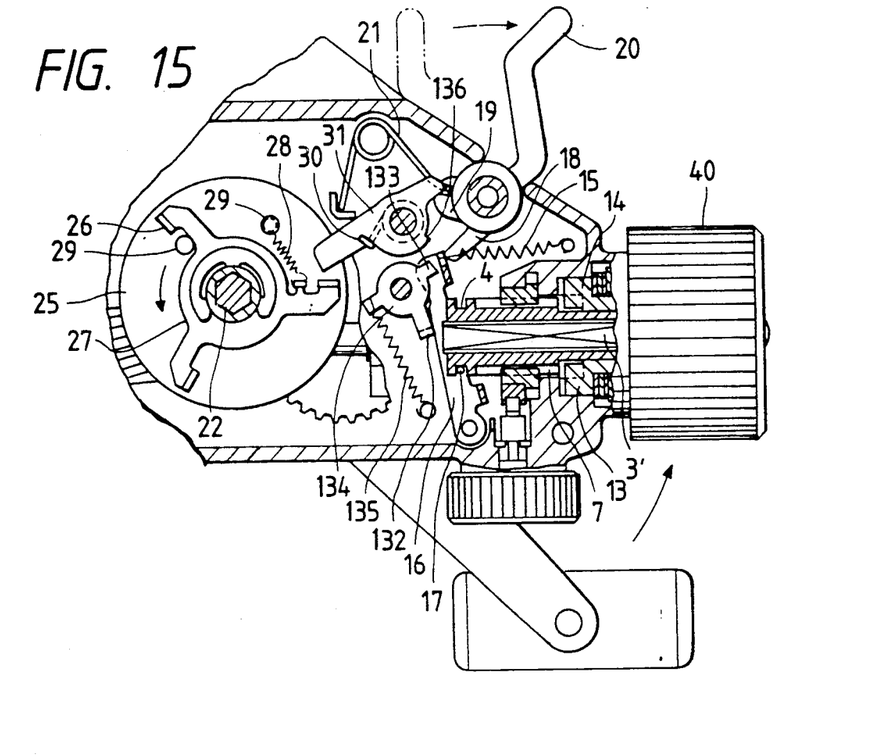
FIG. 15 is a view for explaining the actuated state of the present invention.
Figure 16:
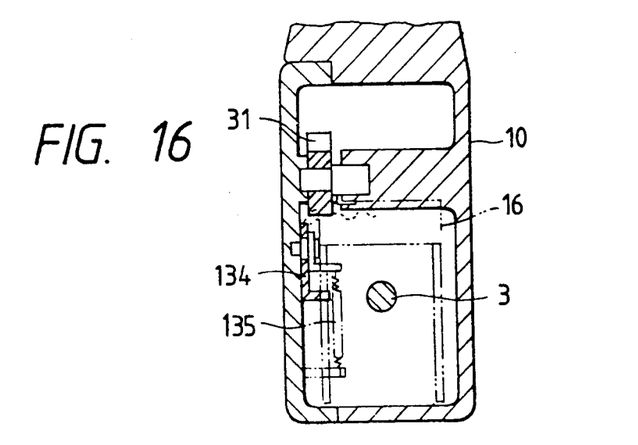
FIG. 16 is a section taken on line C—C of FIG. 14.

FIG. 14 to 16 show an embodiment of the present invention. In this embodiment, a regulator member 134 having a regulating projection 132 and an engagement projection 133 is supported by the reel casing 10 and held by an urging spring 135 so as to be disposed in front of an upper portion of the actuator member 16 so that the engagement projections 133 is engaged with an engagement portion 136 of the return actuator member 31 in the upright position of the operation lever 20 and the forward rotation of the actuator member 16 is regulated by the regulating projection 132.

When the operation lever 20 is in its upright state as illustrated by a solid in FIG. 14, the actuator member 16 is pulled by the spring 15 so that the yoke 17 holds the cylindrical shaft 9 so that the engagement portions 7 of the cylindrical shaft 9 engages with the engagement holes 13 of the braking cylinder 14. This makes the braking cylinder 14 having the drag mechanism 11 rotate together with the spool shaft 3 through the cylindrical shaft 9 to thereby perform drag braking on the spool shaft 3 by means of the drag mechanism 11, while the front end of the return actuator member 31 is held outside the rotational locus of the kick portions 26 of the return member 27 provided on the handle shaft 22 at the rear surface of the drive gear 25. Further, the engagement projection 133 is engaged with the engagement poriton 136 of the return actuator member 31 so that the regulator member 134 is held in the regulating position and the regulating projection 132 prevents the actuator member 16 from rotating forward and prevent the engagement portion 7 of the cylindrical shaft 9 from coming off from the engagement holes 13 by the spinning tension.

Next, in order to perform a change-over from the drag actuated state into a spool-free state, the operation lever 20 is swung backward as shown in FIG. 2. As a result, the return portion 19 rotates the return actuator member 31 to thereby makes the engagement portion 136 of the return actuator member 31 disengage from the engagement projection 33 of the regulator member 134 so as to release the regulating position of the regulator member 134. At the same time, the actuating poriton 18 makes the actuator member 16 slant forward against the spring 15, so that the yoke 17 engaging with the annular groove 4 makes the cylindrical shaft 9 slide forward to thereby make the engagement portions 7 of the cylindrical shaft 9 disengage from the engagement holes 13 of the braking cylinder 14. This makes the spool shaft 3 and the drag mechanism 11 separate form each other, so that the spool shaft 3 becomes rotatable to thereby realize a spool-free state. Further, the rotation of the return actuator member 31 by the return portion 19 makes the front end of the return actuator member 31 be held inside the rotational locus of the kick portions 26 of the return member 27.

Further, in order to perform returning change-over from this spool-free state into the drag actuated state again, the handle shaft 22 is rotated counterclockwise in FIG. 3, that is, in the fishing-line winding direction. As a result, the kick portions 26 of the return member 27 rotate with the rotation of the handle shaft 22 to thereby engage with the front end of the return actuator member 31 so that the return actuator member 31 is rotated so as to pass over the dead point of the spring 21. Therefore, the operation lever 20 retruns to the upright position in the drug-actuated state and the actuator member 6 is pulled rearward by the spring 15 to thereby make the cylindrical shaft 9 slide backward so as to make the engagement portions 7 engage with the engagement holes 13 to thereby return-hold the front end of the return actuator member 31 outside the rotational locus of the kick poritons 26. At the same time, the engagement portion 136 of the return actuator member 31 engages with the engagement projection 133 of the regulator member 134 so as to return-hold the regulator member 134 in the regulating position to thereby prevent the actuator member 16 from rotating forward.

Figure 17:
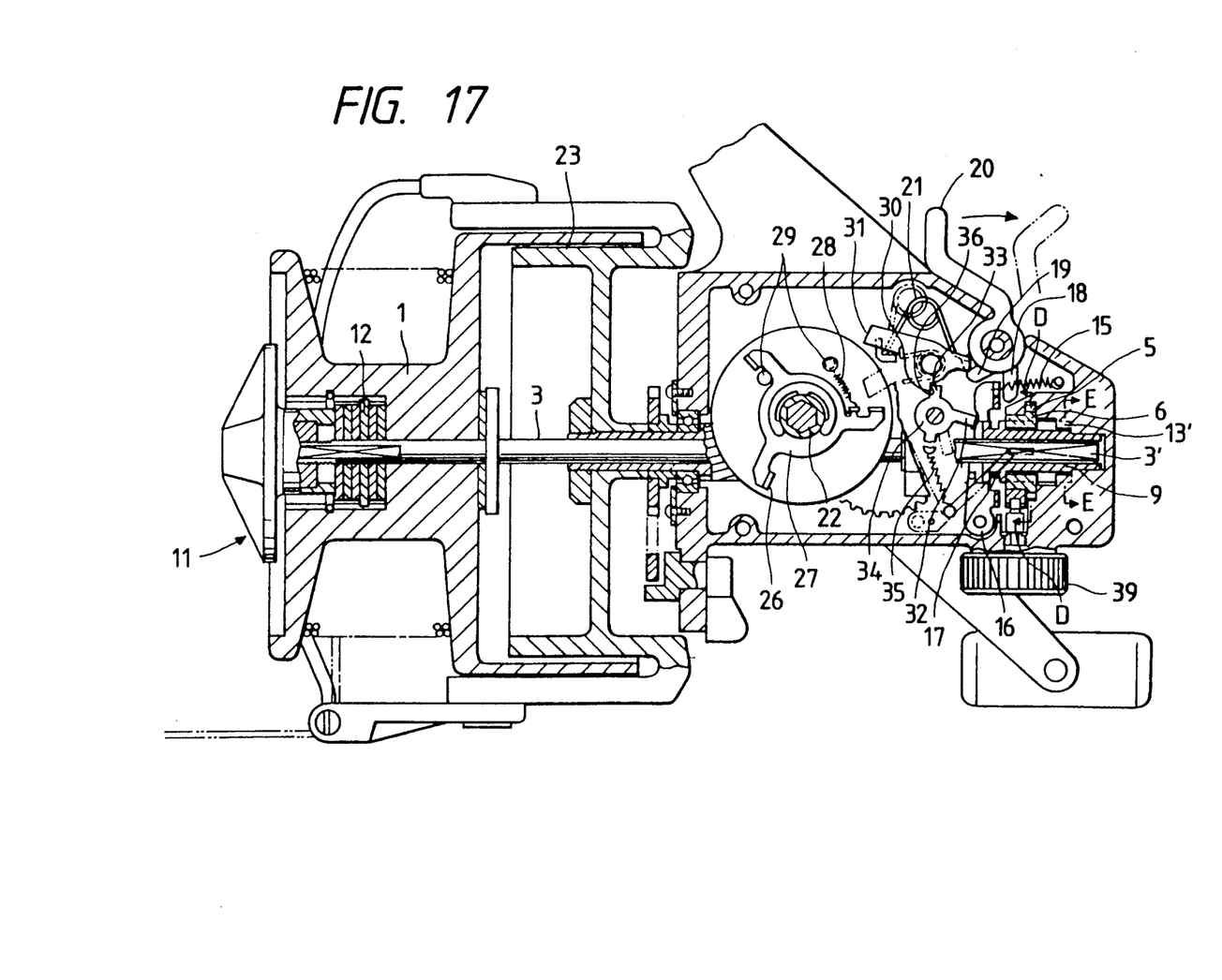
FIG. 17 is a partially broken front view showing the main part of the seventh embodiment of the present invention.

Moreover, FIG. 17 shows an embodiment of the front drag system in which a drag mechanism 11 is provided between the front end of a spool shaft 3 and a spool 1. Spline-shaped engagement portions 7 of a cylindrical shaft are formed so as to be able to engage-with-/disengage-from engagement holes 13, formed in a reel casing 10.

According to the present invention, in the change-over system of this kind as described above in which a drag mechanism is immediately changed over between a drag-actuated state and a spool-free state, as means for making engagement portions provided on a rear end of a cylindrical shaft engage/disengage with/from engagement holes formed in a braking cylinder or a reel casing, a yoke provided across an actuator member pivoted at its lower end is made to rotatably engage with an annular groove formed in the cylindrical shaft, an upper end portion of the actuator member is pulled backward by a spring, and an actuating portion of an operation lever pivoted on a rear portion of the reel casing is made to engage with the rear side of the upper end portion. Accordingly, compared with the conventional system in which a cylindrical shaft is directly slid by an operation lever, the transmission force of rotation of the rotation lever is smoothly converted into sliding operation of the cylindrical shaft so as to smoothly and surely perform engagement operation between the engagement portions and the engagement holes, to smoothly and lightly perform change-over operation by means of the operation lever, to improve the strength and durability of the engagement portion between the engagement portions and the engagement holes, and to minimize the engagement portion to thereby reduce the reel casing in size as well as in weight. Further, the present invention can be easily applied to both the rear and front drag systems.

In addition, a return member having kick portions and urged by a spring so as to rotate by a pre-determined angle together with a drive gear is fittingly mounted on a handle shaft at the rear surface of the drive gear, and a return actuator member made to come inside/outside the operational locus of the return member by the actuation of the operation lever is provided between the return member and a return portion provided on the operation lever. The present invention therefore has superior features and utility as follows. That is, by the rotational operation of a handle, the engagement portions of the cylindrical shaft smoothly and easily engages either the engagement holes in the braking cylinder or the reel casing to thereby make it possible to automotically change-over the drag mechanism from the spool free-rotating state into the drag actuated state. At the same time, the return member is made to engage with the return actuator member by the spring with the rotation of the drive gear to thereby rotate the return actuator member so that the transmission action is carried out lightly and smoothly with less resistance in return operation to thereby make it possible to perform the return operation efficiently. In addition, the configuration of the device thereof is simple without requiring much space and the reel casing can be made compact.

Further, according to the present invention, the regulator member for regulating the actuator member is provided in front of the upper portion of the actuator member. In addition, the release means for releasing the regulation of the regulator member is interlocked with the change-over operation of the operation lever into a drag-free state. Therefore, the regulator member prevents the engagement portions of the cylindrical shaft from disengaging from the engagement holes of the braking cylinder or of the reel casing even if a large load is exerted in the axial direction of the cylindrical shaft because of a spinning operation, so that the present invention can be sufficiently cope with increase of a spinning load due to a large fish while maintaining a light operational property of the operation lever.

What is claimed is:

1. A drag mechanism in a spinning reel for fishing, comprising:
   a reel casing;
   an actuator member having a first end pivoted on said reel casing and having a second end tensionally connected to a spring;
   a yoke pivoted across said actuator member;
   a spool shaft;
   a braking cylinder having drag mechanism means and engagement holes;
   a cylindrical shaft fitted on an end of said spool shaft so as to be slidable only in the axial direction and rotatably locked in said yoke, said cylindrical shaft having engagement portions axially engageable/-disengageable fitted in said engagement holes; and
   an operation lever pivoted on said reel casing, said operation lever having an actuating portion engaged with a side of said second end of said actuator member, said operation lever being provided with a spring for urging said operation lever between a first and second position.

2. A drag mechanism in a spring reel for fishing according to claim 1, further comprising:
   a braking body partially provided with click teeth and being integrally fitted on an outer circumferential portion of said cylindrical shaft;
   a click pawl engaged with said click teeth; and
   a braking member made into contact with an outer circumference of said braking body with a variable contacting force.

3. A drag mechanism in a spring reel for fishing according to claim 1, further comprising:

a regulator member provided at an upper front side of said actuator member for regulating the rotation of said actuator member; and a release means for releasing the regulation by said regulator member in response to a change-over operation into a drag free state by said operation lever.

4. The drag mechanism according to claim 1, further comprising:

a return member provided with kick portions, fittingly mounted on a handle shaft provided on said reel casing, and urged by a spring so as to be rotatable by a predetermined angle with respect to said handle shaft;

a return portion projectingly provided on said operation lever; and a return actuator member pivoted on said reel casing at a portion between said return member and said return portion so as to come into a rotational locus of said return member in response to actuation of said operation lever, said return actuator member being urged by a spring away from an axis of rotation of said return member.

5. The drag mechanism according to claim 4, further a regulator rod slidably provided on said reel casing for selectively preventing said actuator member from coming into said rotational locus of said return member.

6. The drag mechanism according to claim 1, further comprising:

a return member provided with kick portions, fittingly mounted on a handle shaft provided on said reel casing, and urged by a spring so as to be rotatable by a predeteremined angle with respect to said handle shaft; and wherein said second end of said actuator member comes into a rotational locus of said return member in response to actuation of said operation lever.

7. A drag mechanism in a spinning reel for fishing, comprising:

a reel casing having engagement holes formed at its rear end portion;

an actuator member having a lower end portion pivoted on a lower portion of said reel casing and having an upper end portino pulled backward by a spring;

a yoke pivoted across said actuator member;

a spool shaft having a drag mechanism means provided at its top end portion;

a cylindrical shaft fitted in a rear end of said spool shaft so as to be slidable only in the axial direciton and rotatably locked in said yoke, said cylindrical shaft having engagement portions axially engageably/disengageably fitted in said engagement holes; and an operation lever pivoted on a rear portion of said reel casing, said operation lever having an acutating portion engaged with the rear side of an upper portion of said actuator member, said operation lever being provided with a spring for distribution-urging said lever in the directions opposite to each other.

8. A drag mechanism in a spring reel for fishing according to claim 7, further comprising:

a braking body partially provided with click teeth and being integrally fitted on an outer circumferential portion of said cylindrical shaft;

a click pawl engaged with said click teeth; and a braking member made into contact with an outer circumference of said braking body with a variable contacting force.

9. A drag mechanism in a spring reel for fishing according to claim 7, further comprising:

a regulator member provided at an upper front side of said actuator member for regualting the rotation of said actuator member; and a release means for releasing the regulation by said regulator member in response to a change-over operation into a drag free state by said operation lever.

10. A drag mechanism in a spinning reel for fishing, comprising:

a drive gear;

a reel casing;

a handle shaft provided on said reel casing;

a return member provided with kick portions, fittingly mounted on said handle shaft, and urged by a spring so as to be rotatable by a predetermined angle with respect to said handle shaft;

an operation lever pivoted on said reel casing and in engagement with a spring, said operation lever having a return portion projectingly provided thereon; and a return actuator member pivoted on said reel casing at a portion between said return member and said return portion so as to come into a rotational locus of said return member in response to actuation of said operation lever, said return actuator member being urged by a spring away from an axis of rotation of said return member.

11. The drag mechanism according to claim 10, further comprising:

an actuator member having a first end pivoted on said reel casing and having a second end tensionally connected to a spring;

a yoke pivoted across said actuator member;

a spool shaft;

a braking cylinder having a drag mechanism means and engagement holes;

a cylindrical shaft fitted on an end of said spool shaft so as to be slidable only in the axial direction and rotatably locked in said yoke, said cylindrical shaft having engagement portions axially engageably/disengageably fitted in said engagement holes; and an actuating portion provided on said operation lever and engaged with a side of said second end of said actuator member, said operation lever being urged between a first and second position by said spring engaged therewith.

12. The drag mechanism according to claim 10, further comprising:

engagement holes formed in said reel casing;

an actuator member having a first end pivoted on said reel casing and having a second end tensionally connected to a spring;

a yoke pivoted across said actuator member;

a spool shaft having a drag mechanism means;

a cylindrical shaft fitted on an end of said spool shaft so as to be slidable only in the axial direction and rotatably locked in said yoke, said cylindrical shaft having engagement portions axially engageably//disengageably fitted in said engagement holes; and an actuating portion provided on said operation lever and engaged with a side of said second end of said actuator member, said operation lever being urged between a first and second position by said spring engaged therewith.

13. The drag mechanism according to claim 12, further comprising:

a regulator member rotatably provided on said reel casing for regulating the rotation of said actuator member when said operation lever is in said first position, said regulator member being rotated in conjunction with the operation of said operation lever from said first position to said second position for releasing the regulation thereof against said actuator member.

* * * * *

UNITED STATES PATENT AND TRADEMARK OFFICE
CERTIFICATE OF CORRECTION

PATENT NO. : 5,195,698
DATED     : March 23, 1993
INVENTOR(S) : Kyoichi KANEKO

It is certified that error appears in the above-identified patent and that said Letters Patent is hereby corrected as shown below:

On the title page, item (75) inventor should read

-- Kyoichi KANEKO --

Item (19) should read --Kaneko--.

Signed and Sealed this

Thirtieth Day of November, 1993

Attest:

BRUCE LEHMAN

Attesting Officer

Commissioner of Patents and Trademarks